(12) United States Patent
Hayashi

(10) Patent No.: US 10,690,096 B2
(45) Date of Patent: Jun. 23, 2020

(54) FILTER MODULE AND FUEL PUMP MODULE UTILIZING SAME

(71) Applicant: DENSO CORPORATION, Kariya, Aichi-pref (JP)

(72) Inventor: Norihiro Hayashi, Kariya, Aichi-pref (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 16/268,629

(22) Filed: Feb. 6, 2019

(65) Prior Publication Data

US 2019/0170097 A1 Jun. 6, 2019

Related U.S. Application Data

(63) Continuation of application No. PCT/JP2017/030444, filed on Aug. 25, 2017.

(30) Foreign Application Priority Data

Aug. 26, 2016 (JP) .................................. 2016-165504

(51) Int. Cl.
    *F02M 37/10* (2006.01)
    *F02M 37/50* (2019.01)
    *F02B 37/02* (2006.01)

(52) U.S. Cl.
    CPC ........... *F02M 37/10* (2013.01); *F02B 37/025* (2013.01); *F02M 37/50* (2019.01)

(58) Field of Classification Search
    CPC .... F02M 37/025; F02M 37/10; F02M 37/106; F02M 37/50
    See application file for complete search history.

(56) References Cited

U.S. PATENT DOCUMENTS

| 4,860,714 A | * | 8/1989 | Bucci | ................ F02M 37/0082 123/514 |
| 5,070,849 A | * | 12/1991 | Rich | ................... F02M 37/106 123/509 |
| 5,080,077 A | * | 1/1992 | Sawert | ................... F02M 37/02 123/509 |

(Continued)

FOREIGN PATENT DOCUMENTS

| DE | 102007018819 A1 * | 10/2008 | ........... B60K 15/077 |
| EP | 0 918 926 | 6/1999 | |

(Continued)

*Primary Examiner* — John M Zaleskas
(74) *Attorney, Agent, or Firm* — Nixon & Vanderhye PC

(57) ABSTRACT

A suction filter includes a filter screen and a filter opening portion while the filter opening portion communicates between a cavity and an outside of the filter screen. A connector includes: a connector main body, which is shaped into a tubular form; a connector inlet, which is connected to the filter opening portion; a connector outlet, which is connected to a suction inlet of a fuel pump; and a connector opening portion, which communicates between an inside and an outside of the connector main body. A jet pump includes: a jet pump main body, which is shaped into a tubular form; a jet pump inlet, which is connected to the connector opening portion; a jet pump outlet, which is formed at the other end of the jet pump main body; and a jet nozzle, which discharges the fuel from a nozzle outlet toward the jet pump outlet.

24 Claims, 8 Drawing Sheets

(56) References Cited

U.S. PATENT DOCUMENTS

| | | | | |
|---|---|---|---|---|
| 5,218,942 A * | 6/1993 | Coha | F02M 37/106 | 123/509 |
| 5,263,459 A * | 11/1993 | Talaski | F02M 37/103 | 123/516 |
| 5,330,475 A * | 7/1994 | Woodward | F02M 37/106 | 123/509 |
| 5,452,701 A * | 9/1995 | Tuckey | B60K 15/077 | 123/509 |
| 5,702,237 A * | 12/1997 | Hill | B01D 29/114 | 417/313 |
| 6,155,793 A * | 12/2000 | Tuckey | F02M 37/025 | 123/509 |
| 6,640,789 B2 * | 11/2003 | Gabauer | B60K 15/077 | 123/509 |
| 6,988,491 B2 | 1/2006 | Burhenne et al. | | |
| 9,151,257 B2 | 10/2015 | Jeon et al. | | |
| 2001/0055530 A1 * | 12/2001 | Eck | F02M 37/025 | 417/87 |
| 2002/0014225 A1 * | 2/2002 | Ushigome | F02M 37/106 | 123/509 |
| 2003/0111060 A1 * | 6/2003 | Ito | F02M 37/50 | 123/509 |
| 2004/0211396 A1 * | 10/2004 | Burhenne | B60K 15/077 | 123/509 |
| 2005/0133097 A1 * | 6/2005 | Mitani | F02M 25/0818 | 137/565.22 |
| 2005/0286103 A1 * | 12/2005 | Yu | F02M 37/106 | 123/509 |
| 2006/0076287 A1 * | 4/2006 | Catlin | F02M 37/025 | 210/416.4 |
| 2006/0291995 A1 * | 12/2006 | Ikeya | F04D 13/06 | 415/55.1 |
| 2007/0116581 A1 * | 5/2007 | Hagist | F02M 37/025 | 417/360 |
| 2008/0135561 A1 * | 6/2008 | Sanden | B60K 15/077 | 220/562 |
| 2008/0196780 A1 * | 8/2008 | Tipton | F02M 37/10 | 137/861 |
| 2009/0050551 A1 * | 2/2009 | Kimisawa | F02M 37/10 | 210/172.4 |
| 2013/0061960 A1 * | 3/2013 | Jeon | F02M 37/103 | 137/544 |
| 2015/0224873 A1 * | 8/2015 | Ishitoya | F02M 37/025 | 123/509 |
| 2015/0285670 A1 | 10/2015 | Takahashi et al. | | |
| 2016/0245246 A1 * | 8/2016 | Niwa | F02M 37/50 | |
| 2017/0304749 A1 * | 10/2017 | Niwa | B01D 27/06 | |
| 2017/0314521 A1 * | 11/2017 | Niwa | F02M 37/106 | |

FOREIGN PATENT DOCUMENTS

| | | | | |
|---|---|---|---|---|
| JP | 3-73662 | | 7/1991 | |
| JP | 2008155890 A | * | 7/2008 | B60K 15/077 |
| JP | 4200346 | | 12/2008 | |
| JP | 2011153600 A | * | 8/2011 | |
| JP | 2014-62493 | | 4/2014 | |

* cited by examiner

US 10,690,096 B2

FILTER MODULE AND FUEL PUMP MODULE UTILIZING SAME

CROSS REFERENCE TO RELATED APPLICATIONS

This application is a continuation application of International Patent Application No. PCT/JP2017/030444 filed on Aug. 25, 2017, which designated the U.S. and claims the benefit of priority from Japanese Patent Application No. 2016-165504 filed on Aug. 26, 2016. The entire disclosures of all of the above applications are incorporated herein by reference.

TECHNICAL FIELD

The present disclosure relates to a filter module and a fuel pump module utilizing the same.

BACKGROUND

Previously, there is known a filter module to be installed to a fuel pump that is configured to supply fuel from an inside of a fuel tank to an internal combustion engine while the filter module is configured to filter the fuel.

SUMMARY

According to the present disclosure, there is provided a filter module to be installed to a fuel pump that is configured to supply fuel from an inside of a fuel tank to an internal combustion engine while the filter module is configured to filter the fuel. The filter module includes a suction filter, a connector and a jet pump. The suction filter includes a filter screen that forms a cavity in an inside of the filter screen and is configured to pass the fuel and air through the filter screen between the cavity and an outside of the filter screen. The connector connects between the suction filter and the fuel pump. The jet pump is connected to the connector and is configured to discharge fuel from a nozzle outlet.

According to the present disclosure, there is also provided a fuel pump module that includes the filter module.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
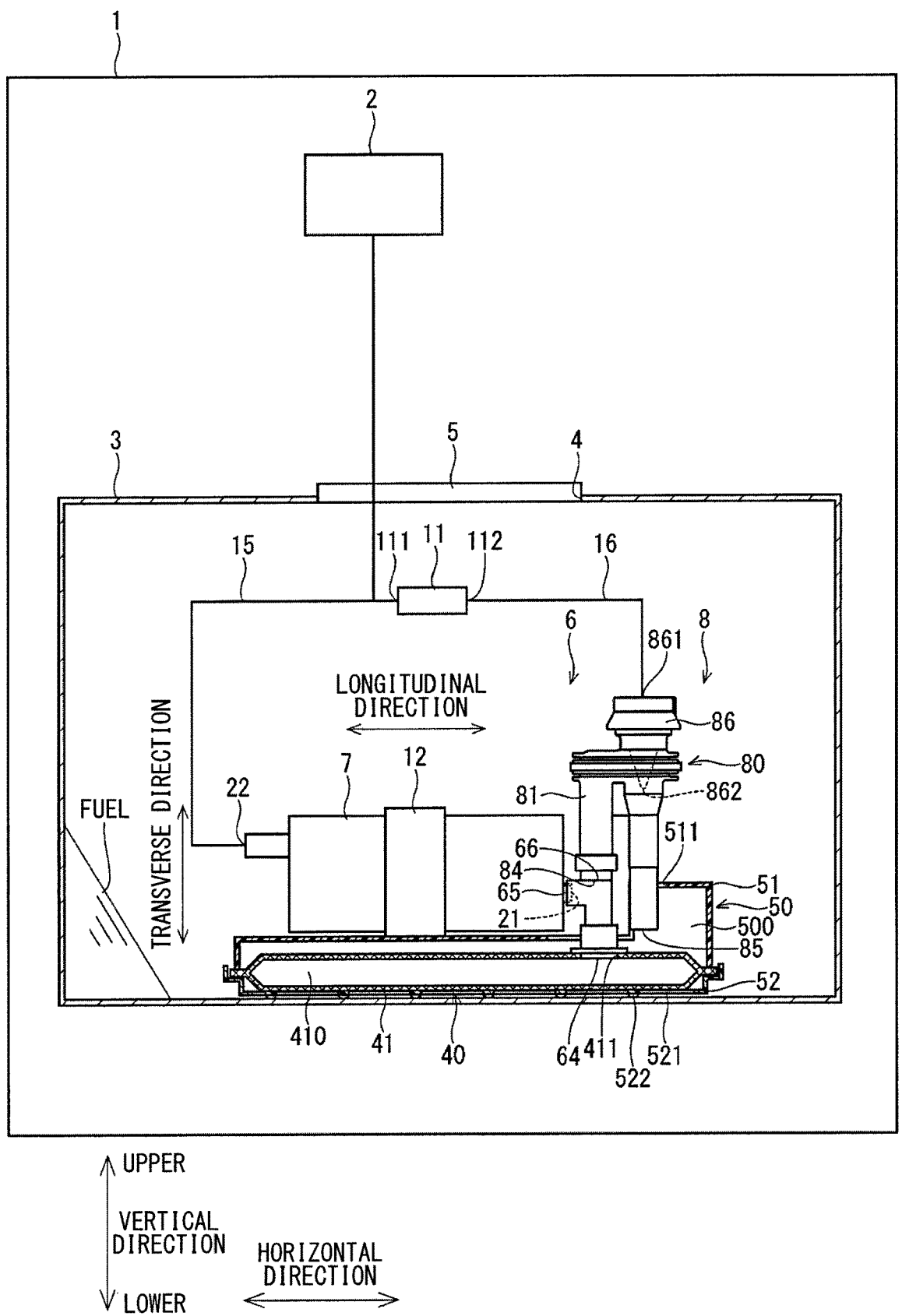
FIG. 1 is a schematic diagram showing a filter module and a fuel pump module according to a first embodiment of the present disclosure.

Previously, there is known a filter module to be installed to a fuel pump that is configured to supply fuel from an inside of a fuel tank to an internal combustion engine while the filter module is configured to filter the fuel. For example, a previously proposed filter module is installed to a fuel pump that is installed in an inside of a fuel tank of a vehicle. This filter module includes a suction filter and a jet pump. In this filter module, an inlet of the jet pump is placed at an upper part of a cavity of the suction filter, and the fuel, which contains air present at the upper part of the cavity, is suctioned by the jet pump to limit suctioning of the air into the fuel pump.

In this filter module, the jet pump is provided to suction the air held in the inside of the suction filter, and the inlet of the jet pump is placed at a location that is different from a location of a suction inlet of the fuel pump. Therefore, the fuel pump suctions the fuel from the suction inlet only by a negative pressure generated by driving, for example, an impeller. Thereby, the negative pressure, which is exerted at the suction inlet of the fuel pump, is small, and the fuel suction amount, which is the amount of fuel that can be suctioned by the fuel pump per unit time, is small.

When the vehicle turns or accelerates or decelerates in a state where the amount of fuel in the fuel tank is small, the fuel may be forced to deviate to one side in the fuel tank. In the fuel pump, in which the above-described filter module is installed, the negative pressure, which is exerted at the suction inlet of the fuel pump, is insufficient, so that it is difficult to reliably suction the fuel, which remains in the cavity of the suction filter. Therefore, there is a possibility of that the amount of fuel supplied to the internal combustion engine becomes insufficient at the time of turning the vehicle or the time of accelerating or decelerating the vehicle.

According to one aspect of the present disclosure, there is provided a filter module to be installed to a fuel pump that is configured to supply fuel from an inside of a fuel tank to an internal combustion engine while the filter module is configured to filter the fuel. The filter module includes a suction filter, a connector and a jet pump.

The suction filter includes: a filter screen that forms a cavity in an inside of the filter screen and is configured to pass the fuel and air through the filter screen between the cavity and an outside of the filter screen; and a filter opening portion that is formed at the filter screen and communicates between the cavity and the outside of the filter screen. The suction filter filters the fuel that passes through the filter screen.

The connector includes: a connector main body, which is shaped into a tubular form; a connector inlet, which is formed at one end of the connector main body and is connected to the filter opening portion; a connector outlet, which is formed at another end of the connector main body and is connected to a suction inlet of the fuel pump; and a connector opening portion, which communicates between an inside and an outside of the connector main body. The connector connects between the suction filter and the fuel pump and conducts the fuel, which is present in the cavity, to the fuel pump through the connector inlet, the connector main body and the connector outlet.

The jet pump includes: a jet pump main body, which is shaped into a tubular form; a jet pump inlet, which is formed at one end of the jet pump main body and is connected to the connector opening portion; a jet pump outlet, which is formed at another end of the jet pump main body; and a jet nozzle, which includes a nozzle outlet placed in an inside of the jet pump main body while the jet nozzle is configured to discharge the fuel from the nozzle outlet toward the jet pump outlet.

In the jet pump, when the fuel is discharged from the nozzle outlet of the jet nozzle, a negative pressure is generated between the nozzle outlet and the jet pump inlet to generate a flow of fluid from the connector main body to the jet pump outlet side through the jet pump inlet and the jet pump main body. At this time, the negative pressure, which is generated between the nozzle outlet and the jet pump inlet, is applied to the connector inlet. Therefore, the negative pressure, which is generated by the fuel pump, and the negative pressure, which is generated by the jet pump, are exerted at the connector inlet. In this way, the fuel suction amount of the fuel pump can be increased.

Thus, in a case where the filter module and the fuel pump are installed in the inside of the fuel tank of the vehicle, even when the fuel in the fuel tank deviates toward one side at the time of turning the vehicle or the time of accelerating or decelerating the vehicle in the state where the fuel in the fuel tank is relatively small, the fuel, which remains in the cavity of the suction filter, can be more reliably suctioned into the fuel pump to provide the sufficient amount of fuel to the internal combustion engine.

Hereinafter, various embodiments of the present disclosure will be described with reference to the drawings. In the following embodiments, substantially identical parts are indicated by the same reference signs and will not be described redundantly for the sake of simplicity.

First Embodiment

Figure 2:
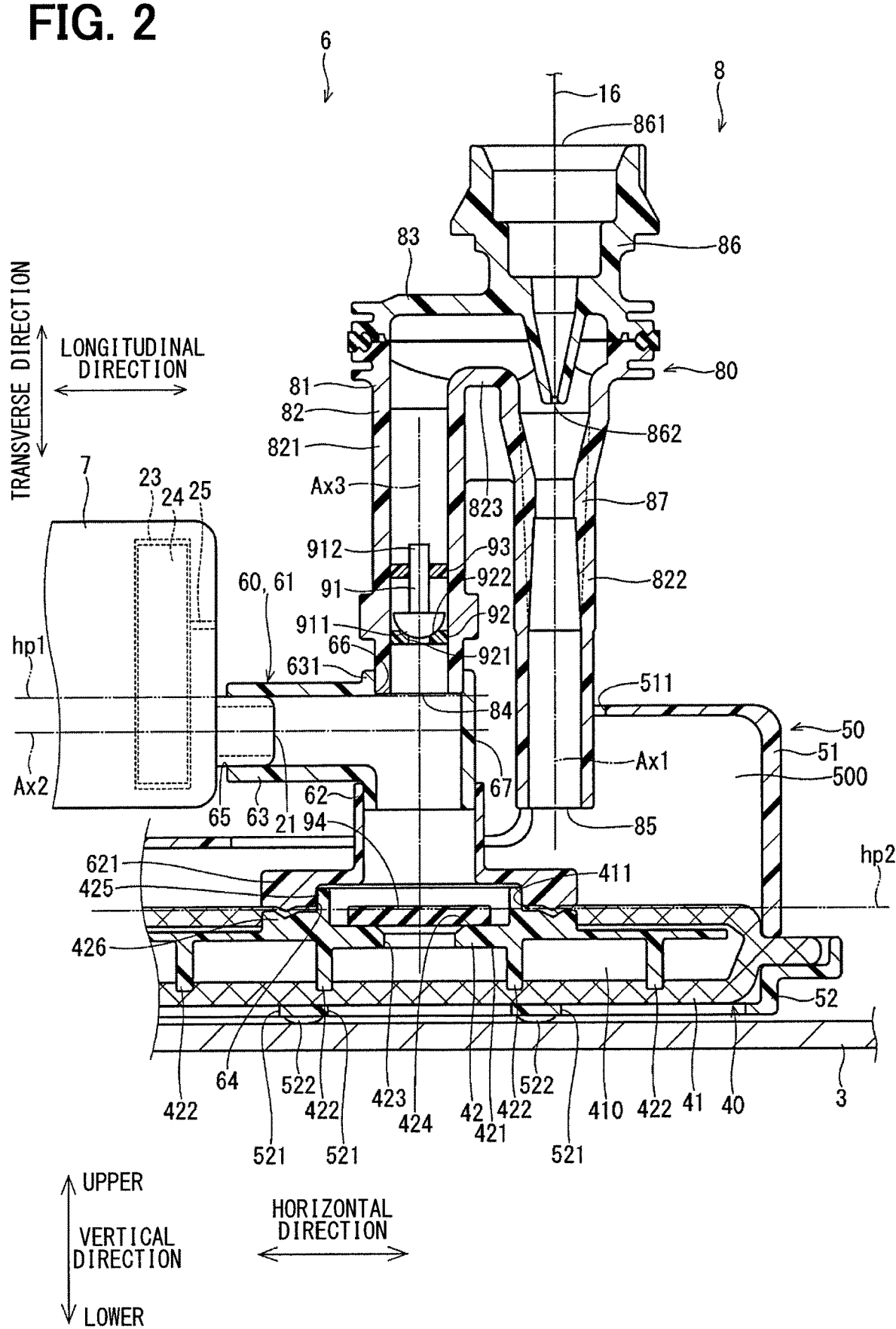
FIG. 2 is a cross-sectional view showing a connector of the filter module and its adjacent area according to the first embodiment of the present disclosure.

FIGS. 1 and 2 show a filter module and a fuel pump module according to a first embodiment of the present disclosure.

The fuel pump module 6 is placed in an inside of a fuel tank 3 of a vehicle 1. The fuel tank 3 stores, for example, gasoline as fuel. A tank opening portion 4 is positioned at an upper side of the fuel tank 3 in the vertical direction. The tank opening portion 4 is closed with a cover 5.

The fuel pump module 6 suctions the fuel stored in the fuel tank 3 and discharges the suctioned fuel to an internal combustion engine (hereinafter referred to as an engine) 2, which serves as a fuel supply subject.

The fuel pump module 6 includes a fuel pump 7 and a filter module 8.

The fuel pump 7 includes a suction inlet 21, a discharge outlet 22, a pump chamber 23, an impeller 24 and a vapor outlet hole 25. The fuel pump 7 pressurizes the suctioned fuel in the pump chamber 23 upon suctioning of the fuel through the suction inlet 21. The fuel, which is discharged from the discharge outlet 22, is supplied to the engine 2.

In the fuel pump 7, the impeller 24, which is placed in the pump chamber 23, is rotated by an electric motor (not shown) to pressurize the fuel in the pump chamber 23.

The vapor outlet hole 25 connects between the pump chamber 23 and an outside of the fuel pump 7. Thereby, the vapor, which is generated in the pump chamber 23 or is drawn into the pump chamber 23, can be discharged to the outside along with the fuel through the vapor outlet hole 25 (see FIG. 2).

In the present embodiment, a pressure regulator 11 is placed between the discharge outlet 22 of the fuel pump 7 and the engine 2.

The pressure regulator 11 has an inlet 111 and an outlet 112. The inlet 111 of the pressure regulator 11 is connected to a fuel passage 15 that extends between the discharge outlet 22 of the fuel pump 7 and the engine 2. When the pressure of the fuel at the inlet 111 of the pressure regulator 11 becomes equal to or larger than a predetermined value, the fuel at the inlet 111 outflows from the outlet 112 side. Thereby, the pressure of the fuel at the inlet 111 of the pressure regulator 11, i.e., the pressure of the fuel to be supplied to the engine 2 is kept at the predetermined value.

The filter module 8 includes a suction filter 40, a connector 60, a jet pump 80, a check valve 91 and a limiter valve 94.

The suction filter 40 includes a filter screen 41 and a skeletal member 42.

The filter screen 41 is formed by folding a sheet of nonwoven fabric and joining peripheral edge parts of the folded sheet together. A cavity 410, which is a planar space, is formed in an inside of the filter screen 41. The fuel and the air can pass through the filter screen 41 between the cavity 410 and the outside of the filter screen 41. The filter screen 41 captures foreign objects contained in the fuel, which passes through the filter screen 41 from the outside of the filter screen 41 to the cavity 410.

In the present embodiment, the filter screen 41 is made into a planar form having, for example, a rectangular shape. Furthermore, the filter screen 41 is formed such that a pore size of the filter screen 41 is progressively reduced from the outer side to the inner side of the filter screen 41.

A filter opening portion 411 is formed at the filter screen 41. The filter opening portion 411 is formed to communicate between the cavity 410 and the outside. In the present embodiment, the filter opening portion 411 is formed in the filter screen 41 at a location that is remote from the center of the filter screen 41, i.e., is decentered from the center of the filter screen 41 (see FIG. 1). Therefore, a distance between a connector inlet 64 and an end part of the cavity 410 of the filter screen 41 is relatively long.

As shown in FIG. 2, the skeletal member 42 is placed in the cavity 410. The skeletal member 42 is made of, for example, resin. The skeletal member 42 includes a skeletal member main body 421, a plurality of leg portions 422, an opening portion 423, a valve seat 424, a tubular portion 425 and a clamping portion 426.

The skeletal member main body 421 is formed into, for example, a plate form. The leg portions 422 extend from a surface of the skeletal member main body 421 toward an inner surface of the filter screen 41. The plurality of leg portions 422 is formed. Thereby, it is ensured that a volume of the cavity 410 of the filter screen 41 is equal to or larger than a predetermined value.

The opening portion 423 extends through the skeletal member main body 421 in a plate thickness direction of the skeletal member main body 421 at the location that corresponds to the location of the filter opening portion 411.

The valve seat 424 is formed at a surface of the skeletal member main body 421, which is opposite from the leg portions 422, such that the valve seat 424 is in a ring form and extends around the opening portion 423.

The tubular portion 425, which is in s substantially cylindrical tubular form, extends from an outer peripheral part of the valve seat 424 toward an opposite side that is opposite from the leg portions 422. Here, the tubular portion 425 is placed in the inside of the filter opening portion 411.

The clamping portion 426 is in a ring form and is formed around the tubular portion 425.

The suction filter 40 filters the fuel that passes through the filter screen 41.

In the present embodiment, the fuel pump module 6 includes a case 50.

The case 50 includes an upper case 51 and a lower case 52. The upper case 51 and the lower case 52 are made of, for example, resin and are respectively shaped into a substantially dish form.

The case 50 is placed such that an outer peripheral part of the filter screen 41 is clamped between an outer peripheral part of the upper case 51 at an opening 423 portion side and an outer peripheral part of the lower case 52 at the opening portion 423 side. Thereby, a space 500 is formed between the upper case 51 and the lower case 52. The suction filter 40 is placed in the space 500 at the inside of the case 50.

A case opening portion 511 is formed at the upper case 51. The case opening portion 511 is formed at a bottom portion of the upper case 51 to communicate between an inside and an outside of the upper case 51 at a location that corresponds to the filter opening portion 411.

A plurality of holes 521 and a plurality of projections 522 are formed at the lower case 52.

The holes 521 penetrate through a bottom portion of the lower case 52 in a direction of a plate thickness of the bottom portion of the lower case 52. The projections 522 project from the bottom portion of the lower case 52 toward an opposite side that is opposite from the suction filter 40.

The case 50 is placed in the inside of the fuel tank 3 such that the projections 522 contact the bottom portion of the fuel tank 3. Therefore, a gap, which has a size corresponding to a height of the projections 522, is formed between the bottom portion of the lower case 52 and the bottom portion of the fuel tank 3. Thereby, the fuel at the bottom portion of the fuel tank 3 can flow into the space 500 through this gap and the holes 521.

A support portion 12 is formed at the upper case 51. The support portion 12 supports the fuel pump 7.

The connector 60 includes a connector main body 61, the connector inlet 64, a connector outlet 65 and a connector opening portion 66.

The connector main body 61 is made of, for example, resin and is shaped into a tubular form. The connector main body 61 includes main bodies 62, 63.

The main body 62 is shaped into a substantially cylindrical tubular form. The connector inlet 64 is formed at one end part of the main body 62. The clamping portion 621 is formed at the main body 62. The clamping portion 621 is shaped into a ring form such that the clamping portion 621 extends radially outward from the one end part of the main body 62.

The main body 62 is formed integrally with the suction filter 40 such that an inner wall of one end part of the main body 62, i.e., the connector inlet 64 is fitted to an outer wall of the tubular portion 425 of the skeletal member 42. In this way, the connector inlet 64 is joined to the filter opening portion 411. A peripheral part of the filter opening portion 411 of the filter screen 41 is clamped between the clamping portion 426 of the skeletal member 42 and a clamping portion 621 of the connector main body 61. The main body 62 is placed on an inner side of the case opening portion 511.

The main body 63 is shaped into a substantially L-shape tubular form. The main body 63 includes a bent portion 67 that is bent. In the present embodiment, the bent portion 67 is bent at a generally right angle.

One end part of the main body 63 is joined to an opposite end part of the main body 62, which is opposite from the connector inlet 64. The connector outlet 65 is formed at the other end part of the main body 63. The connector outlet 65 is joined to the suction inlet 21 of the fuel pump 7.

The connector opening portion 66 is formed at the bent portion 67 such that the connector opening portion 66 communicates between an inside and an outside of the main body 63.

A tubular portion 631, which is in a substantially cylindrical tubular form, extends from a peripheral part of the connector opening portion 66. The tubular portion 631 is coaxial with the main body 62. Here, the term "coaxial" is not necessarily limited to the case where the axes precisely coincide with each other, but may also refer to a case where the axes slightly deviate from each other. The above discussion with respect to the term "coaxial" should be equally applied whenever the term "coaxial" is used in the following description.

The connector 60 guides the fuel, which is present in the cavity 410 of the suction filter 40, to the fuel pump 7 through the connector inlet 64, the connector main body 61 and the connector outlet 65.

The jet pump 80 includes a jet pump main body 81, a jet pump inlet 84, a jet pump outlet 85, a jet nozzle 86 and a venturi tube 87.

The jet pump main body 81 is made of, for example, resin and is shaped into a tubular form. The jet pump main body 81 includes main bodies 82, 83. The main body 82 and the main body 83 are joined together to form the jet pump main body 81, which is shaped into a substantially U-shape tubular form.

More specifically, the main body 82 includes an inlet tubular portion 821, an outlet tubular portion 822 and a connecting portion 823. The inlet tubular portion 821 and the outlet tubular portion 822 are respectively shaped into a substantially cylindrical tubular form and are parallel to each other. The connecting portion 823 joins between an end part of the inlet tubular portion 821 and an end part of the outlet tubular portion 822. The main body 83 is joined to the connecting portion 823 of the main body 82.

The jet pump inlet 84 is formed at an opposite end part of the inlet tubular portion 821, which is opposite from the connecting portion 823, i.e., is formed at one end part of the jet pump main body 81. The jet pump main body 81 is formed such that an outer wall of the one end part of the jet pump main body 81 is fitted to an inner wall of the tubular portion 631 of the connector 60. In this way, the jet pump inlet 84 is joined to the connector opening portion 66.

The jet pump outlet 85 is formed at the other end part of the outlet tubular portion 822, which is opposite from the connecting portion 823, i.e., is formed at the other end part of the jet pump main body 81. In the present embodiment, the opposite end part of the outlet tubular portion 822, which is opposite from the connecting portion 823, and the jet pump outlet 85 are placed on the inner side of the case opening portion 511 of the upper case 51.

The jet nozzle 86 is made of, for example, resin and is formed integrally with the main body 83 of the jet pump main body 81 in one piece. The jet nozzle 86 is formed such that an inner diameter of the jet nozzle 86 is progressively reduced from one end side toward the other end side of the jet nozzle 86. The jet nozzle 86 includes a nozzle inlet 861 and a nozzle outlet 862. The nozzle inlet 861 is formed at one end of the jet nozzle 86. The nozzle outlet 862 is formed at the other end of the jet nozzle 86. Here, the nozzle outlet 862 is placed in an inside of the outlet tubular portion 822, i.e., is placed in an inside of the connector main body 61.

A fuel passage 16 connects between the nozzle inlet 861 and the outlet 112 of the pressure regulator 11. Therefore, the fuel, which outflows from the outlet 112 of the pressure regulator 11, flows into the jet nozzle 86. Thereby, the fuel is discharged from the nozzle outlet 862. Here, the jet nozzle 86 discharges the fuel from the nozzle outlet 862 toward the jet pump outlet 85 side.

In the jet pump 80, when the fuel is discharged from the nozzle outlet 862 of the jet nozzle 86, a negative pressure is generated between the nozzle outlet 862 and the jet pump inlet 84 to guide the fluid from the connector main body 61 to the jet pump outlet 85 side through the jet pump inlet 84 and the jet pump main body 81. At this time, the negative pressure, which is generated between the nozzle outlet 862 and the jet pump inlet 84, is applied to the connector inlet 64. Therefore, the negative pressure, which is generated by the fuel pump 7, and the negative pressure, which is generated by the jet pump 80, are applied to the connector inlet 64.

The venturi tube 87 is made of, for example, resin and is formed integrally with the main body 82 in one piece in a tubular form. The venturi tube 87 is formed between the nozzle outlet 862, which is placed in the inside of the jet pump main body 81, and the jet pump outlet 85, i.e., the venturi tube 87 is formed in the inside of the outlet tubular portion 822. An inner diameter of the venturi tube 87 is smaller than an inner diameter of the outlet tubular portion 822, i.e., an inner diameter of the jet pump main body 81. Therefore, a flow of the fuel, which is discharged from the nozzle outlet 862 of the jet nozzle 86, is restricted by the venturi tube 87. Thereby, the negative pressure generating effect can be generated between the nozzle outlet 862 and the jet pump inlet 84.

The check valve 91 is placed in the inside of the jet pump main body 81. More specifically, the check valve 91 is placed between the jet pump inlet 84 and the nozzle outlet 862 in the inside of the jet pump main body 81. The check valve 91 includes a seat portion 911 and a shaft portion 912. The seat portion 911 is shaped into a hemispherical form. The shaft portion 912, which is in a substantially cylindrical form, extends from an opposite surface of the seat portion 911, which is opposite from the spherical surface.

A valve seat portion 92 and a support portion 93 are formed in the inside of the jet pump main body 81.

The valve seat portion 92 is shaped into a substantially circular disk form, and an outer peripheral part of the valve seat portion 92 is fitted to an inner wall of the jet pump main body 81. An opening portion 921 is formed at a center of the valve seat portion 92. A valve seat 922, which is shaped into a ring form, is formed around the opening portion 921 of the valve seat portion 92 on an opposite side that is opposite from the jet pump inlet 84.

The support portion 93 is fitted to the inner wall of the jet pump main body 81. The support portion 93 is slidable relative to the shaft portion 912 of the check valve 91, and thereby the support portion 93 supports the check valve 91 in a manner that enable reciprocation of the check valve 91 in the axial direction. The check valve 91 is liftable from the valve seat 922 through lifting of the seat portion 911 from the valve seat 922 and is seatable against the valve seat 922 through seating of the seat portion 911 against the valve seat 922.

When the seat portion 911 is lifted from the valve seat 922, the check valve 91 enables the flow of the fuel from the jet pump inlet 84 side toward the jet pump outlet 85 side. In contrast, when the seat portion 911 is seated against the valve seat 922, the check valve 91 limits the flow of the fuel from the jet pump outlet 85 side toward the jet pump inlet 84.

A limiter valve 94 is placed at an inside of the tubular portion 425 of the skeletal member 42 of the suction filter 40, i.e., is placed adjacent to the connector inlet 64. The limiter valve 94 is made of, for example, rubber and is shaped into a substantially circular disk form. An outer diameter of the limiter valve 94 is larger than an inner diameter of the opening portion 423 of the skeletal member 42. The limiter valve 94 is reciprocatable in the axial direction at the inside of the tubular portion 425. An outer peripheral part of a surface of the limiter valve 94, which is located on one side, is liftable from and is seatable against the valve seat 424 of the skeletal member 42.

When the limiter valve 94 is lifted from the valve seat 424, the limiter valve 94 enables flow of the fuel from the cavity 410 of the suction filter 40 toward the connector outlet 65. In contrast, when the limiter valve 94 is seated against the valve seat 424, the limiter valve 94 limit flow of the fuel from the connector outlet 65 side to the cavity 410.

As shown in FIG. 2, in the present embodiment, the nozzle outlet 862 and the venturi tube 87 are coaxial to each other. In the present embodiment, the jet nozzle 86, the nozzle inlet 861, the nozzle outlet 862, the outlet tubular portion 822 and the venturi tube 87 are arranged such that the axis of the jet nozzle 86, the axis of the nozzle inlet 861, the axis of the nozzle outlet 862, the axis of the outlet tubular portion 822 and the axis of the venturi tube 87 coincide with the axis Ax1 of the jet pump outlet 85.

Furthermore, in the present embodiment, in a state where the filter module 8 is installed to the fuel pump 7, the jet pump outlet 85 is vertically positioned on the upper side of the suction filter 40 in the vertical direction.

In the present embodiment, in the state where the filter module 8 is installed to the fuel pump 7, the jet pump inlet 84 is vertically positioned on the upper side of a horizontal plane hp1, which extends through an uppermost part of the connector outlet 65, in the vertical direction.

In the present embodiment, in the state where the filter module 8 is installed to the fuel pump 7, the jet pump inlet 84 is vertically positioned on the upper side of an axis Ax2 of the suction inlet 21 of the fuel pump 7 in the vertical direction.

Furthermore, in the present embodiment, in the state where the filter module 8 is installed to the fuel pump 7, the jet pump inlet 84 is vertically positioned on the upper side of a horizontal plane hp2, which passes the filter opening portion 411, in the vertical direction.

Furthermore, in the present embodiment, the jet pump inlet 84 and the filter opening portion 411 are coaxially placed. In the present embodiment, the filter opening portion 411, the tubular portion 425, the main body 62, the tubular portion 631 and the connector opening portion 66 are coaxial with an axis Ax3 of the jet pump inlet 84.

In the present embodiment, in the state where the filter module 8 is installed to the fuel pump 7, the axes Ax1, Ax3 extend in the vertical direction, the axis Ax2 extends in the horizontal direction.

Furthermore, in the present embodiment, in the state where the filter module 8 is installed to the fuel pump 7, the axis of the inlet tubular portion 821 and the axis of the outlet tubular portion 822 of the main body 82 extend in the vertical direction.

Also, in the present embodiment, the suction filter 40 is shaped into the planar form. The fuel pump 7 is shaped into an elongated form. The fuel pump 7 is placed such that a longitudinal direction of the fuel pump 7 is parallel to a direction of the plane of the suction filter 40 (see FIG. 1). Therefore, the fuel pump module 6 can be easily installed into the inside of the fuel tank 3 through the tank opening portion 4, and the fuel pump module 6 can be compactly placed in the inside of the fuel tank 3. The filter opening portion 411 is formed in the filter screen 41 at the location that is remote from the center of the filter screen 41, i.e., is decentered from the center of the filter screen 41, so that the distance between the connector inlet 64 and the end part of the cavity 410 of the filter screen 41 becomes relatively long.

Furthermore, in the present embodiment, in the state where the fuel pump module 6 is placed in the inside of the fuel tank 3, the fuel pump 7 is vertically positioned on the upper side of the suction filter 40 in the vertical direction.

Furthermore, in the present embodiment, the suction filter 40 is placed such that the direction of the plane of the suction filter 40 is along the horizontal direction. The fuel pump 7 is placed such that the longitudinal direction of the fuel pump 7 is along the horizontal direction.

Next, an operation of the fuel pump module 6 of the present embodiment will be described.

When an electric power is supplied to the electric motor of the fuel pump 7 by an electronic control unit (not shown), the impeller 24 is rotated. In this way, the fuel, which is present in the connector 60, is suctioned into the pump chamber 23 through the suction inlet 21. The fuel, which is pressurized in the pump chamber 23, is discharged from the discharge outlet 22 and is supplied to the engine 2 through the fuel passage 15.

When the pressure of the fuel in the inside of the fuel passage 15 becomes equal to or larger than the predetermined value, the fuel outflows from the pressure regulator 11 into the fuel passage 16. Thereby, the fuel in the fuel passage 16 flows into the jet nozzle 86. Therefore, the fuel is discharged from the nozzle outlet 862 toward the jet pump outlet 85, and thereby the negative pressure is generated between the nozzle outlet 862 and the jet pump inlet 84. At this time, the negative pressure, which is generated at the fuel pump 7, and the negative pressure, which is generated at the jet pump 80, are applied to the connector inlet 64. In this way, the fuel suction amount of the fuel pump 7 can be increased.

Thus, even when the fuel in the fuel tank 3 deviates toward one side at the time of turning the vehicle 1 or the time of accelerating or decelerating the vehicle 1 in the state where the fuel in the fuel tank 3 is relatively small (see FIG. 1), the fuel, which remains in the cavity 410 of the suction filter 40, can be more reliably suctioned into the fuel pump 7 to provide the sufficient amount of fuel to the engine 2.

Furthermore, according to the present embodiment, the jet pump outlet 85 is vertically positioned on the upper side of the suction filter 40 in the vertical direction. Therefore, the fuel, which is discharged from the jet pump outlet 85, flows to or falls on the upper part of the suction filter 40. Thus, the fuel, which is discharged from the jet pump outlet 85, can be suctioned into the cavity 410 once again through the suction filter 40.

Furthermore, according to the present embodiment, the check valve 91 can limit flow of the fuel from the jet pump outlet 85 side to the jet pump inlet 84 side.

Also, according to the present embodiment, the limiter valve 94 can limit flow of the fuel from the connector outlet 65 side to the cavity 410 side.

As discussed above, according to the present embodiment, there is provided the filter module 8 that is configured to be installed to the fuel pump 7 that supplies the fuel from the inside of the fuel tank 3 to the engine 2, and the filter module 8 includes the suction filter 40, the connector 60 and the jet pump 80.

The suction filter 40 includes: the filter screen 41 that forms the cavity 410 in the inside of the filter screen 41 and is configured to pass the fuel and the air through the filter screen 41 between the cavity 410 and the outside of the filter screen 41; and the filter opening portion 411 that is formed at the filter screen 41 and communicates between the cavity 410 and the outside of the filter screen. The suction filter 40 filters the fuel that passes through the filter screen 41.

The connector 60 includes: the connector main body 61, which is shaped into the tubular form; the connector inlet 64, which is formed at the one end of the connector main body 61 and is connected to the filter opening portion 411; the connector outlet 65, which is formed at the other end of the connector main body 61 and is connected to the suction inlet 21 of the fuel pump 7; and the connector opening portion 66, which communicates between the inside and the outside of the connector main body 61. The connector 60 connects between the suction filter 40 and the fuel pump 7 and conducts the fuel, which is present in the cavity 410, to the fuel pump 7 through the connector inlet 64, the connector main body 61 and the connector outlet 65.

The jet pump 80 includes: the jet pump main body 81, which is shaped into the tubular form; the jet pump inlet 84, which is formed at one end of the jet pump main body 81 and is connected to the connector opening portion 66; the jet pump outlet 85, which is formed at the other end of the jet pump main body 81; and the jet nozzle 86, which includes the nozzle outlet 862 placed in the inside of the jet pump main body 81 while the jet nozzle 86 is configured to discharge the fuel from the nozzle outlet 862 toward the jet pump outlet 85.

In the jet pump 80, when the fuel is discharged from the nozzle outlet 862 of the jet nozzle 86, the negative pressure is generated between the nozzle outlet 862 and the jet pump inlet 84 to generate the flow of fluid from the connector main body 61 to the jet pump outlet 85 side through the jet pump inlet 84 and the jet pump main body 81. At this time, the negative pressure, which is generated between the nozzle outlet 862 and the jet pump inlet 84, is applied to the connector inlet 64. Therefore, the negative pressure, which is generated by the fuel pump 7, and the negative pressure, which is generated by the jet pump 80, are applied to the connector inlet 64. In this way, the fuel suction amount of the fuel pump 7 can be increased.

Thus, even when the fuel in the fuel tank 3 deviates toward one side at the time of turning the vehicle 1 or the time of accelerating or decelerating the vehicle 1 in the state where the amount of fuel in the fuel tank 3 is relatively small, the fuel, which remains in the cavity 410 of the suction filter 40, can be more reliably suctioned into the fuel pump 7 to provide the sufficient amount of fuel to the engine 2.

Furthermore, according to the present embodiment, the jet pump 80 includes the venturi tube 87, which is located between the jet pump outlet 58 and the nozzle outlet 862 placed in the inside of the jet pump main body 81 while the venture tube 87 has the inner diameter that is smaller than the inner diameter of the jet pump main body. Thereby, the negative pressure generating effect can be exerted between the nozzle outlet 862 and the jet pump inlet 84. Thus, the fuel suction amount of the fuel pump 7 can be increased.

Furthermore, in the present embodiment, the nozzle outlet 862 and the venturi tube 87 are coaxial to each other.

Therefore, it is possible to reduce the resistance, which is exerted against the fuel at the time of passing through the venturi tube 87 upon the discharging of the fuel from the nozzle outlet 862. Thereby, the negative pressure can be further effectively generated between the nozzle outlet 862 and the jet pump inlet 84. Thus, the fuel suction amount of the fuel pump 7 can be further increased.

Furthermore, in the present embodiment, in a state where the filter module 8 is installed to the fuel pump 7, the jet pump outlet 85 is vertically positioned on the upper side of the suction filter 40 in the vertical direction. Therefore, the fuel, which is discharged from the jet pump outlet 85, flows to or falls on the upper part of the suction filter 40. Thus, the fuel, which is discharged from the jet pump outlet 85, can be suctioned into the cavity 410 once again through the suction filter 40.

Furthermore, in the present embodiment, in the state where the filter module 8 is installed to the fuel pump 7, the jet pump inlet 84 is vertically positioned on the upper side of the horizontal plane hp1, which extends through the connector outlet 65, in the vertical direction. Therefore, the air (air bubbles), which is contained in the fuel, can be guided preferentially to the jet pump 80 side. Thereby, it is possible to limit the flow of the air, which is contained in the fuel, to the connector outlet 65 side. Thus, it is possible to limit the suctioning of the air, which is contained in the fuel, into the fuel pump 7.

Furthermore, in the present embodiment, the connector main body 61 includes the bent portion 67, which is bent and is placed between the connector inlet 64 and the connector outlet 65. The connector opening portion 66 is formed at the bent portion 67. Therefore, the jet pump inlet 84 can be easily positioned on the upper side of the horizontal plane hp1 in the vertical direction.

Furthermore, in the present embodiment, in the state where the filter module 8 is installed to the fuel pump 7, the jet pump inlet 84 is vertically positioned on the upper side of the horizontal plane hp2, which passes the filter opening portion 411, in the vertical direction. Therefore, the air (the air bubbles), which is contained in the fuel that flows in the filter opening portion 411, can be preferentially guided to the jet pump 80 side. Thereby, it is possible to further limit the suctioning of the air, which is contained in the fuel, into the fuel pump 7.

Furthermore, in the present embodiment, the jet pump inlet 84 and the filter opening portion 411 are coaxial to each other. As a result, the air (the air bubbles), which is contained in the fuel that flows in the filter opening portion 411, can be preferentially guided to the jet pump 80 side. Thereby, it is possible to further limit the suctioning of the air, which is contained in the fuel, into the fuel pump 7. Furthermore, the negative pressure, which is generated by the jet pump 80, can be further effectively exerted at the filter opening portion 411 and the connector inlet 64.

Furthermore, there is provided the check valve 91. The check valve 91 is placed in the inside of the jet pump main body 81. The check valve 91 enables the flow of the fuel from the jet pump inlet 84 side toward the jet pump outlet 85 side and limits the flow of the fuel from the jet pump outlet 85 side toward the jet pump inlet 84 side. The check valve 91 can suppress the flow of the fuel from the jet pump outlet 85 side toward the jet pump inlet 84 side. That is, it is possible to limit the backflow of the fuel at the jet pump inlet 84.

Furthermore, in the present embodiment, there is also provided the limiter valve 94. The limiter valve 94 is placed adjacent to the connector inlet 64. The limiter valve 94 enables the flow of the fuel from the cavity 410 side toward the connector outlet 65 side and limits the flow of the fuel from the connector outlet 65 side toward the cavity 410 side. The limiter valve 94 can suppress the flow of the fuel from the connector outlet 65 side toward the cavity 410 side. That is, the backflow of the fuel at the connector inlet 64 can be limited.

Furthermore, the fuel pump module 6 of the present embodiment includes the filter module 8 and the fuel pump 7. The fuel pump 7 includes the suction inlet 21. The suction inlet 21 is configured to suction the fuel and is connected to the connector outlet 65. The suction filter 40 is shaped into the planar form. The fuel pump 7 is shaped into the elongated form and is placed such that the longitudinal direction of the fuel pump 7 is parallel to the direction of the plane of the suction filter 40.

In the present embodiment, since the filter module 8 is provided, it is possible to increase the fuel suction amount of the fuel pump 7. Furthermore, the fuel pump 7 is placed such that the longitudinal direction of the fuel pump 7 is parallel to the direction of the plane of the suction filter 40. Therefore, the fuel pump module 6 can be easily inserted into the fuel tank 3 through the tank opening portion 4 and can be compactly placed in the inside of the fuel tank 3. The filter opening portion 411 is formed in the filter screen 41 at the location that is remote from the center of the filter screen 41, i.e., is decentered from the center of the filter screen 41, so that the distance between the connector inlet 64 and the end part of the cavity 410 of the filter screen 41 becomes relatively long. The filter module 8 of the present embodiment can increase the fuel suction amount of the fuel pump 7. Therefore, even if the distance between the connector inlet 64 and the end part of the cavity 410 of the filter screen 41 is long, the fuel pump 7 can reliably suction the remaining fuel in the cavity 410. Therefore, the present embodiment is suitable for the fuel pump module 6 that has the above-described structure.

Furthermore, in the present embodiment, in the state where the fuel pump module 6 is placed in the inside of the fuel tank 3, the fuel pump 7 is vertically positioned on the upper side of the suction filter 40 in the vertical direction.

Furthermore, in the present embodiment, in the state where the fuel pump module 6 is placed in the inside of the fuel tank 3, the suction filter 40 is arranged such that the direction of the plane is along the horizontal direction. The fuel pump 7 is placed such that the longitudinal direction of the fuel pump 7 is along the horizontal direction.

Therefore, the fuel pump module 6 can be compactly placed in the inside of the fuel tank 3. Furthermore, the fuel, which is accumulated at the bottom portion of the fuel tank 3, can be effectively suctioned through the suction filter 40.

Second Embodiment

Figure 3A:
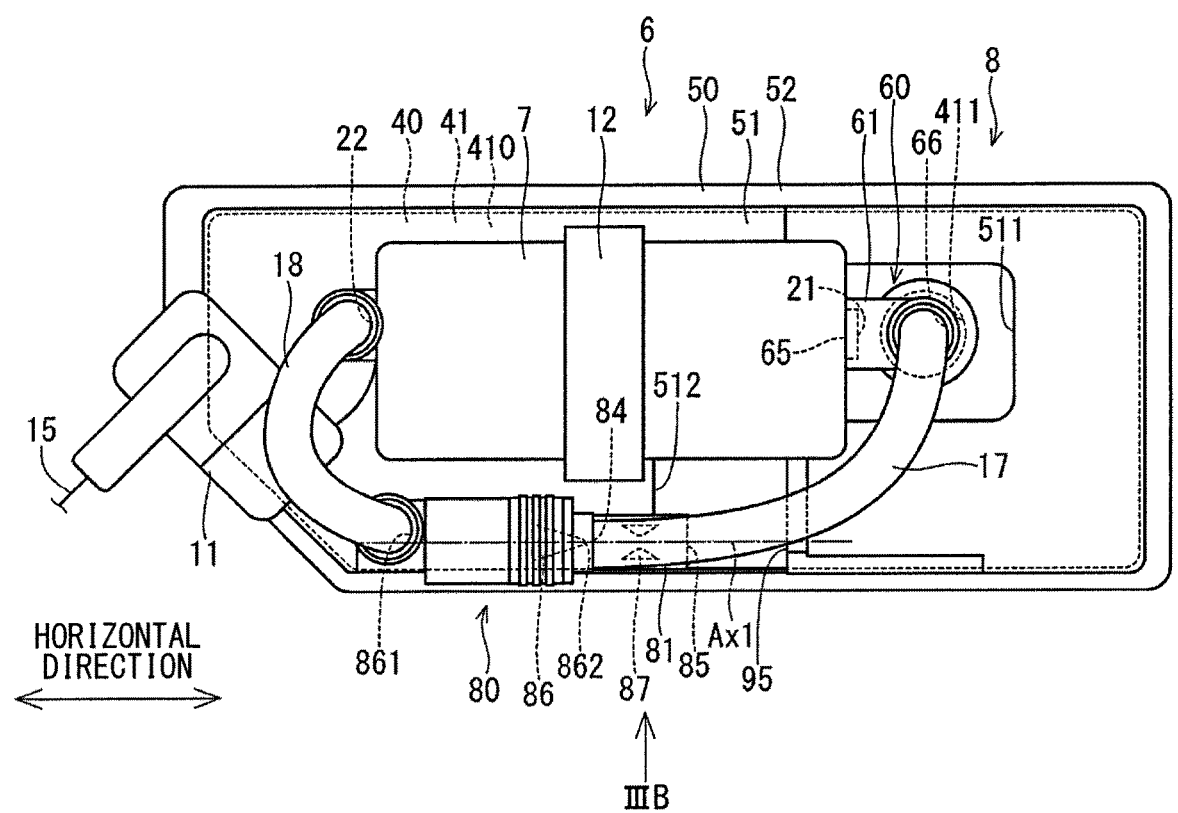
FIG. 3A is a plan view of a filter module and a fuel pump module according to a second embodiment of the present disclosure.
Figure 3B:
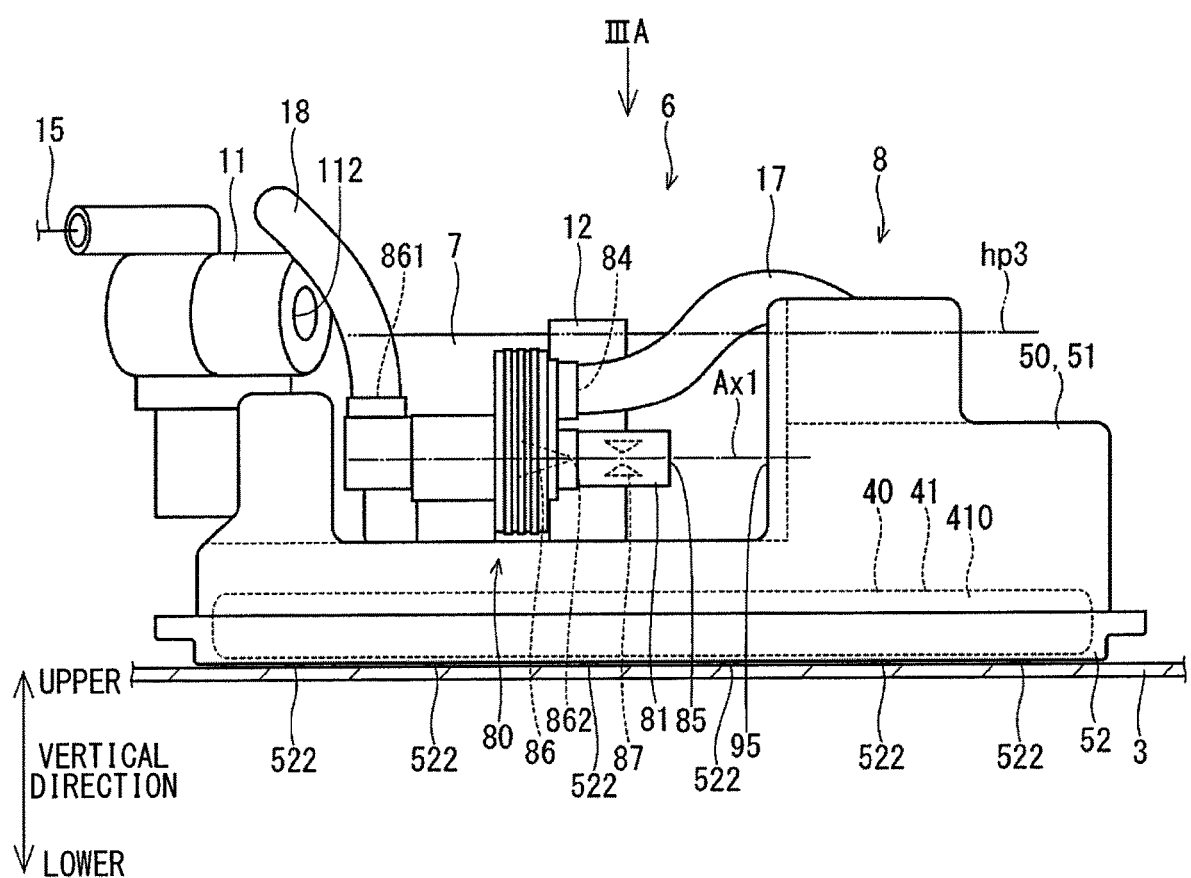
FIG. 3B is a view taken in a direction of an arrow IIIB in FIG. 3A.

FIGS. 3A and 3B show a fuel pump module according to a second embodiment of the present disclosure. The second embodiment differs from the first embodiment with respect to a location of the jet pump 80.

According to the second embodiment, there are further provided hoses 17, 18. The hoses 17, 18 are shaped into a tubular form or a bellows form and have flexibility. The hose 17 connects between the connector opening portion 66 and a jet pump inlet 84. That is, the jet pump inlet 84 is connected to the connector main body 61 of the connector 60 through the hose 17.

The hose 18 connects between the discharge outlet 22 of the fuel pump 7 and the nozzle inlet 861 of the jet pump 80.

With the above construction, the fuel, which is discharged from the discharge outlet 22 of the fuel pump 7, flows into the nozzle inlet 861 through the hose 18 and is discharged from the nozzle outlet 862. In this way, the negative pressure is generated between the nozzle outlet 862 and the jet pump inlet 84, and the fluid in the inside of the connector main body 61 is conducted to the jet pump 80 side through the hose 17. At this time, the negative pressure, which is generated between the nozzle outlet 862 and the jet pump inlet 84, is exerted at the connector inlet 64 through the hose 17. Therefore, the negative pressure, which is generated by the fuel pump 7, and the negative pressure, which is generated by the jet pump 80, are exerted at the connector inlet 64.

The fuel passage 15 connects between the discharge outlet 22 of the fuel pump 7 and the engine 2. The pressure regulator 11 is placed in the fuel passage 15. When the pressure of the fuel in the fuel passage 15 becomes equal to or larger than the predetermined value, the pressure regulator 11 discharges the fuel of the fuel passage 15 through the outlet 112. In this way, the pressure of the fuel of the fuel passage 15, i.e., the fuel to be supplied to the engine 2 is kept to the predetermined value.

In the present embodiment, the jet pump 80 is arranged such that the axis of the jet nozzle 86 and the axis of the jet pump outlet 85 are parallel to the longitudinal direction of the fuel pump 7. In the installed state where the filter module 8 is installed to the fuel pump 7, the jet pump 80 is vertically positioned on a lower side of a horizontal plane hp3, which extends through an uppermost part of the fuel pump 7, in the vertical direction (see FIG. 3B). Furthermore, when the fuel pump module 6 is viewed from the upper side in the vertical direction, the jet pump 80 is placed on an inner side of an outer periphery of the case 50 (see FIG. 3A).

Also, in the present embodiment, similar to the first embodiment, the nozzle outlet 862 and the venturi tube 87 are coaxial to each other. In the present embodiment, the jet nozzle 86, the nozzle outlet 862 and the venturi tube 87 are arranged such that the axis of the jet nozzle 86, the axis of the nozzle outlet 862 and the axis of the venturi tube 87 coincide with the axis Ax1 of the jet pump outlet 85.

Furthermore, in the present embodiment, there is also provided a wall portion 95. The wall portion 95 is formed such that the wall portion 95 is in a plate form and extends upwardly from the upper case 51 of the case 50 in the vertical direction. The wall portion 95 is vertically positioned on the upper side of the suction filter 40 in the vertical direction and is located along the axis Ax1 of the jet pump outlet 85 (see FIGS. 3A and 3B). Therefore, the fuel, which is discharged from the jet pump outlet 85, collides against the wall portion 95 and then flows to or falls on the upper part of the suction filter 40 through the case opening portion 512 of the upper case 51.

In the second embodiment, the remaining structure, which is other than the above described features, is the same as that of the first embodiment.

In the second embodiment, the features, which are the same as those of the first embodiment, can achieve the same advantages as those of the first embodiment.

As discussed above, according to the present embodiment, there is further provided the hose 17. The hose 17 connects between the connector opening portion 66 and the jet pump inlet 84. The hose 17 has the flexibility. Therefore, the jet pump 80 can be placed at any position and any orientation relative to the fuel pump 7.

In the present embodiment, the jet pump 80 and the jet pump outlet 85 are arranged such that the axis of the jet nozzle 86 and the axis of the jet pump outlet 85 are parallel to the longitudinal direction of the fuel pump 7. Therefore, it is possible to limit the jet pump 80 from protruding in the transverse direction of the fuel pump 7. In this way, the fuel pump module 6 can be easily installed into the inside of the fuel tank 3 through the tank opening portion 4, and the fuel pump module 6 can be compactly placed in the inside of the fuel tank 3.

Furthermore, in the present embodiment, there is also provided the wall portion 95. In the state where the fuel pump module 6 is placed in the inside of the fuel tank 3, the wall portion 95 is vertically positioned on the upper side of the suction filter 40 in the vertical direction and is located along the axis Ax1 of the jet pump outlet 85. Therefore, the fuel, which is discharged from the jet pump outlet 85, collides against the wall portion 95 and then flows to or falls on the upper part of the suction filter 40. Thus, the fuel, which is discharged from the jet pump outlet 85, can be suctioned into the cavity 410 once again through the suction filter 40.

Third Embodiment

Figure 4:
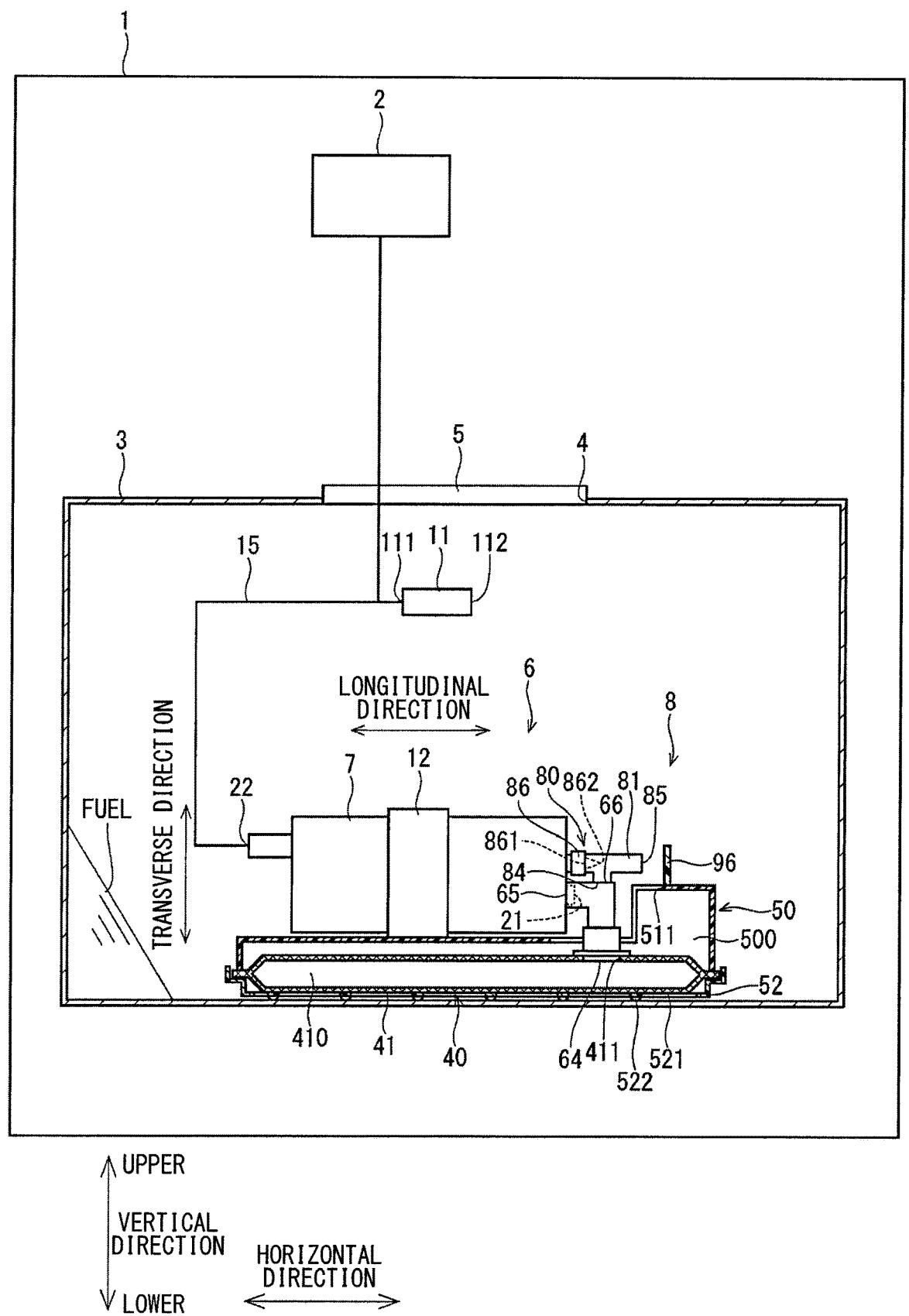
FIG. 4 is a schematic diagram showing a filter module and a fuel pump module according to a third embodiment of the present disclosure.
Figure 5:
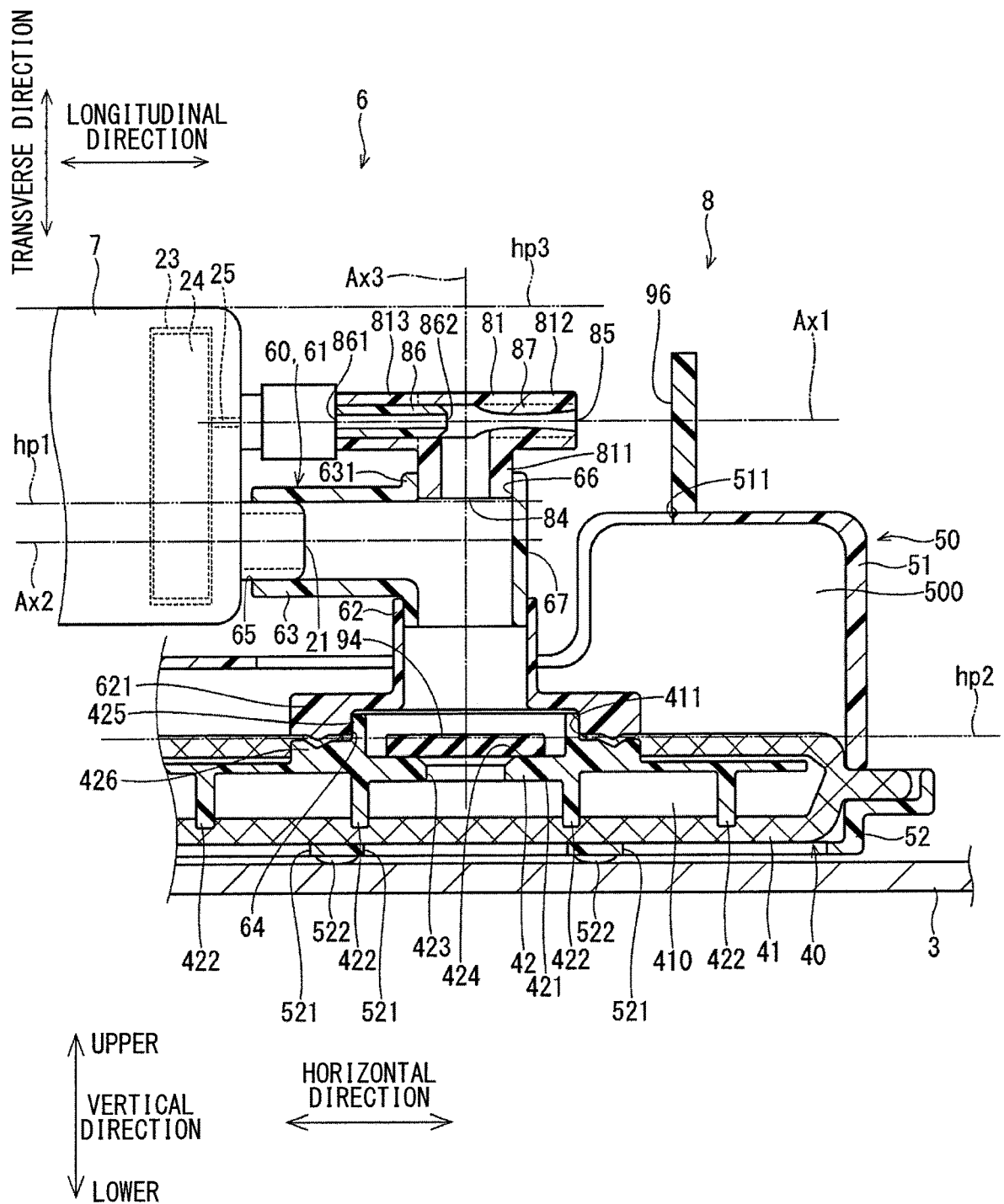
FIG. 5 is a cross-sectional view showing a connector of the filter module and its adjacent area according to the third embodiment of the present disclosure.

FIGS. 4 and 5 show a fuel pump module according to a third embodiment of the present disclosure. The third embodiment differs from the first embodiment with respect to a location of the jet pump 80.

In the third embodiment, the jet pump main body 81 includes an inlet main body 811 and an outlet main body 812. The inlet main body 811 and the outlet main body 812 are respectively shaped into a substantially cylindrical tubular form and are formed integrally in one piece such that an axis of the inlet main body 811 and an axis of the outlet main body 812 are generally perpendicular to each other. Specifically, the jet pump main body 81 is formed into a substantially L-shape.

The jet pump inlet 84 is formed at an opposite end part of the inlet main body 811, which is opposite from the outlet main body 812, that is, the jet pump inlet 84 is formed at one end part of the jet pump main body 81. The jet pump main body 81 is formed such that an outer wall of the one end part of the jet pump main body 81 is fitted to an inner wall of the tubular portion 631 of the connector 60. In this way, the jet pump inlet 84 is joined to the connector opening portion 66.

The jet pump outlet 85 is formed at an opposite end part of the outlet main body 812, which is opposite from the inlet main body 811, that is, the jet pump outlet 85 is formed at the other end part of the jet pump main body 81.

In the present embodiment, the jet pump 80 further includes a tubular portion 813. The tubular portion 813 is formed integrally with the jet pump main body 81 in one piece such that the tubular portion 813 is in a substantially cylindrical tubular form and extends from a connection between the inlet main body 811 and the outlet main body 812 of the jet pump main body 81 toward the opposite side that is opposite from the outlet main body 812. The tubular portion 813 is coaxial with the outlet main body 812.

The jet nozzle 86 is placed in the inside of the tubular portion 813. Here, the nozzle outlet 862 is placed at the connection between the inlet main body 811 and the outlet main body 812.

In the present embodiment, the vapor outlet hole 25 of the fuel pump 7 is connected to the nozzle inlet 861 of the jet nozzle 86. Therefore, the fuel, which includes the air (the air bubbles) and is discharged from the vapor outlet hole 25, is discharged from the nozzle outlet 862 toward the jet pump outlet 85 through the jet nozzle 86. In this way, the negative pressure is generated between the nozzle outlet 862 and the jet pump inlet 84.

The venturi tube 87 is formed integrally with the outlet main body 812 in one piece at the inside of the outlet main body 812.

In the present embodiment, the jet pump 80 is arranged such that the axis of the jet nozzle 86 and the axis of the jet pump outlet 85 are parallel to the longitudinal direction of the fuel pump 7. In the installed state where the filter module 8 is installed to the fuel pump 7, the jet pump 80 is vertically positioned on the lower side of the horizontal plane hp3, which extends through the uppermost part of the fuel pump 7, in the vertical direction (see FIG. 5). Furthermore, when the fuel pump module 6 is viewed from the upper side in the vertical direction, the jet pump 80 is placed on the inner side of the outer periphery of the case 50.

In the present embodiment, the outlet 112 of the pressure regulator 11 opens in the inside of the fuel tank 3.

Also, in the present embodiment, similar to the first embodiment, the nozzle outlet 862 and the venturi tube 87 are coaxial to each other. In the present embodiment, the jet nozzle 86, the nozzle inlet 861, the nozzle outlet 862 and the venturi tube 87 are arranged such that the axis of the jet nozzle 86, the axis of the nozzle inlet 861, the axis of the nozzle outlet 862 and the axis of the venturi tube 87 coincide with the axis Ax1 of the jet pump outlet 85.

Furthermore, according to the present embodiment, there is also provided a wall portion 96. The wall portion 96 is shaped into a plate form and upwardly extends from an outer peripheral edge part of the case opening portion 511 of the upper case 51 in the vertical direction. The wall portion 96 is vertically positioned on the upper side of the suction filter 40 in the vertical direction and is located along the axis Ax1 of the jet pump outlet 85 (see FIG. 5). Therefore, the fuel, which is discharged from the jet pump outlet 85, collides against the wall portion 96 and then flows to or falls on the upper part of the suction filter 40 through the case opening portion 511 of the upper case 51.

In the third embodiment, the remaining structure, which is other than the above described features, is the same as that of the first embodiment.

In the third embodiment, the features, which are the same as those of the first embodiment, can achieve the same advantages as those of the first embodiment.

As discussed above, in the present embodiment, the jet nozzle 86 and the jet pump outlet 85 are arranged such that the axis of the jet nozzle 86 and the axis of the jet pump outlet 85 are parallel to the longitudinal direction of the fuel pump 7. Therefore, it is possible to limit the jet pump 80 from protruding in the transverse direction of the fuel pump 7. In this way, the fuel pump module 6 can be easily installed into the inside of the fuel tank 3 through the tank opening portion 4, and the fuel pump module 6 can be compactly placed in the inside of the fuel tank 3.

Furthermore, according to the present embodiment, there is also provided the wall portion 96. In the state where the fuel pump module 6 is placed in the inside of the fuel tank 3, the wall portion 96 is placed on the upper side of the suction filter 40 in the vertical direction and is located along the axis Ax1 of the jet pump outlet 85. Therefore, the fuel, which is discharged from the jet pump outlet 85, collides against the wall portion 96 and then flows to or falls on the upper part of the suction filter 40. Thus, the fuel, which is discharged from the jet pump outlet 85, can be suctioned into the cavity 410 once again through the suction filter 40.

Fourth Embodiment

Figure 6:
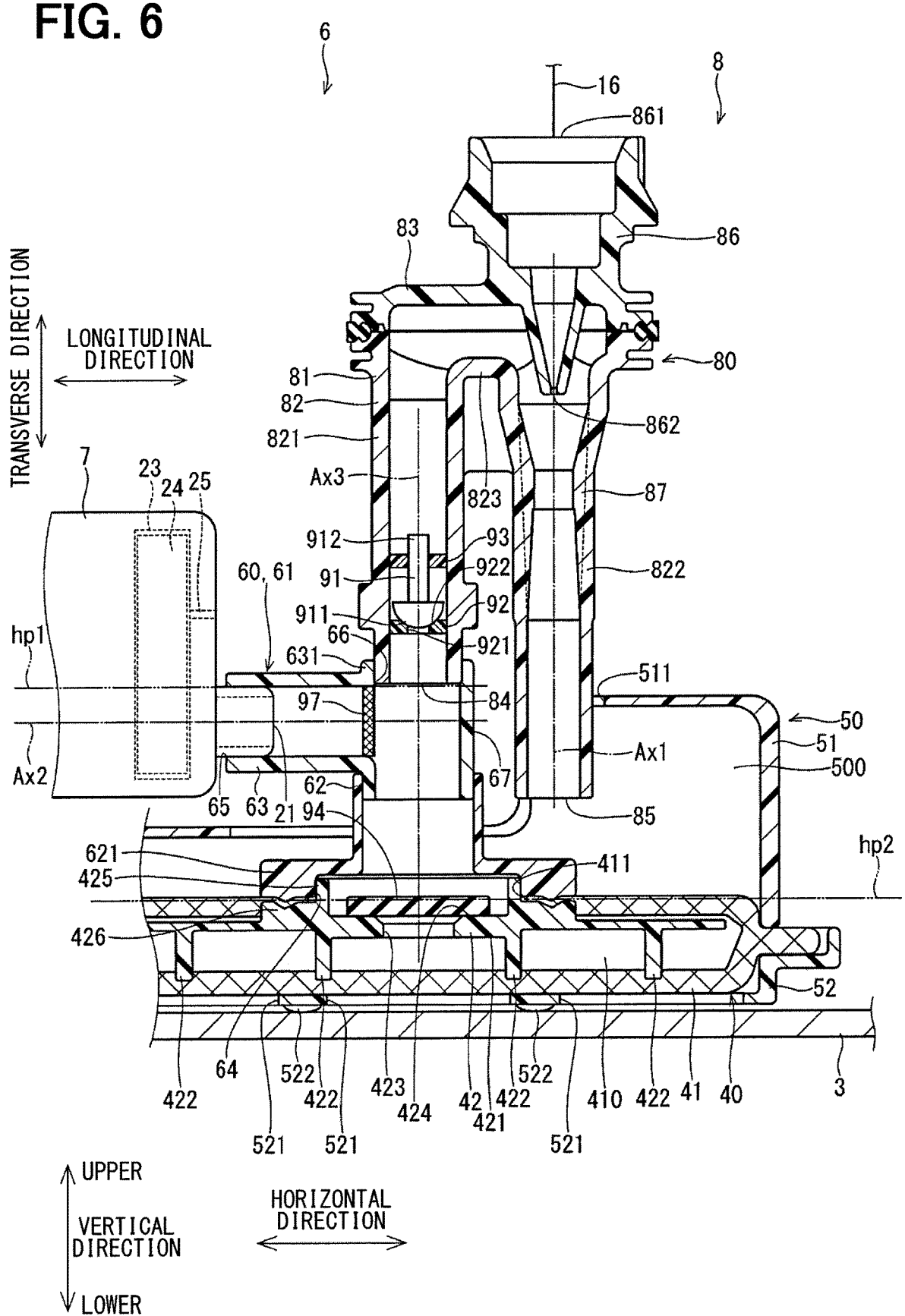
FIG. 6 is a cross-sectional view showing a connector of a filter module and its adjacent area according to a fourth embodiment of the present disclosure.

FIG. 6 shows a portion of a fuel pump module according to a fourth embodiment of the present disclosure.

According to the fourth embodiment, there is further provided a trapping filter 97. The trapping filter 97 is formed into a substantially circular disk form by, for example, a coarse nonwoven fabric. The trapping filter 97 is placed between the connector opening portion 66 and the connector outlet 65 in the inside of the connector main body 61. More specifically, the trapping filter 97 is placed adjacent to the connector opening portion 66 located on the inner side of the main body 83 such that the direction of the plane of the trapping filter 97 is parallel to the axis of the main body 62 and the axis of the tubular portion 631. The trapping filter 97 is coaxial with the suction inlet 21.

The trapping filter 97 can capture the air (the air bubbles) contained in the fuel that passes through the trapping filter 97. The air, which is captured by the trapping filter 97, moves upward in the vertical direction and is guided to the connector opening portion 66 and the jet pump inlet 84.

In the fourth embodiment, the remaining structure, which is other than the above described features, is the same as that of the first embodiment.

In the fourth embodiment, the features, which are the same as those of the first embodiment, can achieve the same advantages as those of the first embodiment.

As discussed above, according to the present embodiment, there is further provided the trapping filter 97. The trapping filter 97 is placed between the connector opening portion 66 and the connector outlet 65 in the inside of the connector main body 61 and is capable of capturing the air contained in the fuel. The air, which is captured by the trapping filter 97, moves upward in the vertical direction and is guided to the connector opening portion 66 and the jet pump inlet 84. Thus, the air (the air bubbles), which is contained in the fuel flowing in the vicinity of the connector opening portion 66, can be preferentially guided to the jet pump 80 side. Thereby, it is possible to further limit the suctioning of the air, which is contained in the fuel, into the fuel pump 7.

Fifth Embodiment

Figure 7:
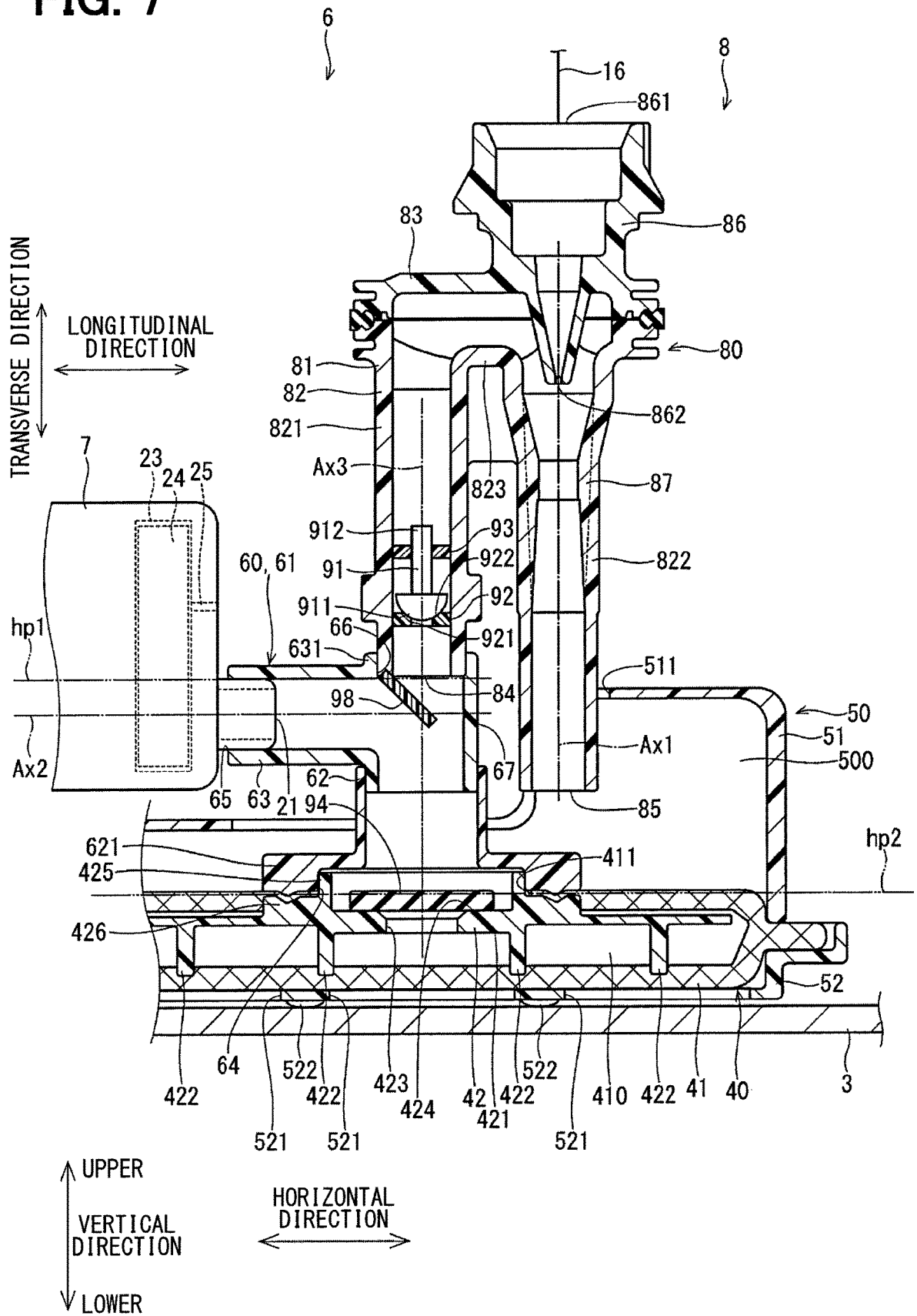
FIG. 7 is a cross-sectional view showing a connector of a filter module and its adjacent area according to a fifth embodiment of the present disclosure.

FIG. 7 shows a portion of a fuel pump module according to a fifth embodiment of the present disclosure.

According to the fifth embodiment, there is further provided a plate portion 98. The plate portion 98 is made of, for example, resin and is shaped into a plate form. The plate portion 98 is placed between the connector opening portion 66 and the connector outlet 65 in the inside of the connector main body 61. More specifically, in a state where the state where the filter module 8 is installed to the fuel pump 7, the plate portion 98 vertically downwardly tilts from an end part of the connector opening portion 66 located on the connector outlet 65 side. Here, the axis of the main body 62, the axis of the tubular portion 631 and the axis Ax2 of the suction inlet 21 extend through the plate portion 98.

The fuel, which is fed into the connector main body 61 through the filter opening portion 411 and the connector inlet 64, is guided by the plate portion 98 toward the connector outlet 65. At this time, the air (the air bubbles), which is contained in the fuel passing along the plate portion 98, passes through a gap between the plate portion 98 and the inner wall of the main body 63 and flows to the connector opening portion 66 and the jet pump inlet 84.

In the fifth embodiment, the remaining structure, which is other than the above described features, is the same as that of the first embodiment.

In the fifth embodiment, the features, which are the same as those of the first embodiment, can achieve the same advantages as those of the first embodiment.

As discussed above, according to the present embodiment, there is further provided the plate portion 98. The plate portion 98 is placed between the connector opening portion 66 and the connector outlet 65 in the inside of the connector main body 61. In the state where the filter module 8 is installed to the fuel pump 7, the plate portion 98 vertically downwardly tilts from the end part of the connector opening portion 66 located on the connector outlet 65 side.

The fuel, which is fed into the connector main body 61 through the filter opening portion 411 and the connector inlet 64, is guided by the plate portion 98 toward the connector outlet 65. At this time, the air (the air bubbles), which is contained in the fuel passing along the plate portion 98, passes through the gap between the plate portion 98 and the inner wall of the main body 63 and flows to the connector opening portion 66 and the jet pump inlet 84. Thus, the air (the air bubbles), which is contained in the fuel flowing in the vicinity of the connector opening portion 66, can be preferentially guided to the jet pump 80 side. Thereby, it is possible to further limit the suctioning of the air, which is contained in the fuel, into the fuel pump 7.

Other Embodiments

In another embodiment of the present disclosure, the nozzle outlet 862 and the venturi tube 87 may not be coaxial with each other. Furthermore, in another embodiment of the present disclosure, the jet pump 80 may not have the venturi tube 87.

Furthermore, in another embodiment of the present disclosure, in the state where the filter module 8 is installed to the fuel pump 7, the jet pump outlet 85 may not be vertically positioned on the upper side of the suction filter 40 in the vertical direction.

Furthermore, in another embodiment of the present disclosure, in the state where the filter module 8 is installed to the fuel pump 7, the jet pump inlet 84 may not be vertically positioned on the upper side of the horizontal plane hp1, which extends through the connector outlet 65, in the vertical direction.

Furthermore, in another embodiment of the present disclosure, in the state where the filter module 8 is installed to the fuel pump 7, the jet pump inlet 84 may not be vertically positioned on the upper side of the horizontal plane hp2, which extends through filter opening portion 411, in the vertical direction.

Furthermore, in another embodiment of the present disclosure, the jet pump inlet 84 and the filter opening portion 411 may not be coaxial with each other.

Furthermore, in another embodiment of the present disclosure, at least one of the valve seat portion 92 and the support portion 93 may not be formed integrally with the jet pump main body 81 in one piece. Furthermore, in another embodiment of the present disclosure, the check valve 91, the valve seat portion 92 and the support portion 93 may be eliminated.

Furthermore, in another embodiment of the present disclosure, the limiter valve 94 may be eliminated.

Furthermore, in another embodiment of the present disclosure, the fuel pump 7 and the filter module 8 may be placed at any orientation.

In the second and third embodiments, there is described the example where there is the wall portion 95, 96 that extends upward from the case 50 in the vertical direction. Alternatively, in another embodiment of the present disclosure, the wall portion may be provided to, for example, the jet pump main body 81 as long as the wall portion is vertically positioned on the upper side of the suction filter 40 in the vertical direction and is plocated along the axis Ax1 of the jet pump outlet 85.

Furthermore, in the first, third, fourth and fifth embodiments, there is described the example where the main body 62 and the main body 63 of the connector main body 61 are formed separately from each other. Alternatively, in another embodiment of the present disclosure, the main body 62 and the main body 63 may be formed integrally in one piece. In this case, the number of the components can be reduced.

Furthermore, in the first, fourth and fifth embodiments, the main body 82 and the main body 83 of the jet pump main body 81 are formed separately from each other. Alternatively, in another embodiment of the present disclosure, the main body 82 and the main body 83 may be formed integrally in one piece. In this case, the number of the components can be reduced. Furthermore, the main body 83 and the jet nozzle 86 are formed separately.

Furthermore, in another embodiment, the connector 60 and at least a portion of the jet pump main body 81 located on the jet pump inlet 84 side may be formed integrally in one piece.

Furthermore, in another embodiment of the present disclosure, the material of the filter screen 41 is not necessarily limited to the nonwoven fabric. For example, the filter screen 41 may be made of a multilayered mesh screen made of, for example, polyamide resin. Furthermore, the filter screen 41 may be made of any type of material as long as the material is capable of capturing the foreign objects contained in the fuel.

Furthermore, in another embodiment of the present disclosure, the material of the trapping filter 97 is not necessarily limited to the nonwoven fabric. For example, the trapping filter 97 may be made of, for example, a mesh screen made of resin (e.g., polyamide resin) or metal.

Furthermore, the filter module 8 and the fuel pump module 6 of the present disclosure are not necessarily applied to the fuel tank of the vehicle. For example, the filter module 8 and the fuel pump module 6 of the present disclosure may be applied to a fuel tank of another type of transport such as a ship or an airplane.

As described above, the present disclosure should not be limited to above embodiments and may be implemented in various other forms without departing from the scope of the present disclosure.

The present disclosure has been described in accordance with the embodiments. However, the present disclosure should not be limited to the embodiments and the structures described above. The present disclosure also encompasses various modifications and variations within the scope of equivalents. Also, various combinations and forms as well as other combinations, each of which includes only one element or more or less of the various combinations, are also within the scope and spirit of the present disclosure.

What is claimed is:

1. A filter module to be installed to a fuel pump that is configured to supply fuel from an inside of a fuel tank to an internal combustion engine while the filter module is configured to filter the fuel, the filter module comprising:
- a suction filter that includes:
  - a filter screen that forms a cavity in an inside of the filter screen and is configured to pass fuel and air through the filter screen between the cavity and an outside of the filter screen; and
  - a filter opening portion that is formed at the filter screen and communicates between the cavity and the outside of the filter screen;
- a connector that includes:
  - a connector main body, which is shaped into a tubular form;
  - a connector inlet, which is formed at one end of the connector main body and is connected to the filter opening portion;
  - a connector outlet, which is formed at another end of the connector main body and is connected to a suction inlet of the fuel pump; and
  - a connector opening portion, which communicates between an inside and an outside of the connector main body; and
- a jet pump that includes:
  - a jet pump main body, which is shaped into a tubular form;
  - a jet pump inlet, which is formed at one end of the jet pump main body and is connected to the connector opening portion;
  - a jet pump outlet, which is formed at another end of the jet pump main body; and
  - a jet nozzle, which includes a nozzle outlet placed in an inside of the jet pump main body while the jet nozzle is configured to discharge the fuel from the nozzle outlet toward the jet pump outlet.

2. The filter module according to claim 1, wherein in a state where the filter module is installed to the fuel pump, the jet pump inlet is vertically positioned on an upper side of an axis of the suction inlet of the fuel pump.

3. The filter module according to claim 2, wherein the jet pump outlet is vertically positioned on a lower side of the axis of the suction inlet of the fuel pump.

4. The filter module according to claim 1, wherein:
the jet pump includes a nozzle inlet that is communicated with the nozzle outlet; and
the nozzle inlet is connected to a fuel passage that connects between a discharge outlet of the fuel pump and the internal combustion engine.

5. The filter module according to claim 4, wherein the nozzle inlet is connected to an outlet of a pressure regulator that is configured to maintain a pressure of the fuel passage at a predetermined value, and the nozzle inlet is connected to the fuel passage through the pressure regulator.

6. The filter module according to claim 1, wherein:
the jet pump includes a nozzle inlet that is communicated with the nozzle outlet; and
the nozzle inlet is connected to a discharge outlet of the fuel pump at a location that is on the fuel pump side of a pressure regulator, wherein the pressure regulator is configured to maintain a pressure of a fuel passage, which connects between the discharge outlet of the fuel pump and the internal combustion engine, at a predetermined value.

7. The filter module according to claim 1, wherein:
the jet pump includes a nozzle inlet that is communicated with the nozzle outlet; and the nozzle inlet is connected to a vapor outlet hole that is configured to discharge vapor generated in a pump chamber of the fuel pump.

8. The filter module according to claim 1, wherein the jet pump includes a venturi tube that is located between the jet pump outlet and the nozzle outlet placed in the inside of the jet pump main body while the venturi tube has an inner diameter that is smaller than an inner diameter of the jet pump main body.

9. The filter module according to claim 8, wherein the nozzle outlet and the venturi tube are coaxial to each other.

10. The filter module according to claim 1, wherein in a state where the filter module is installed to the fuel pump, the jet pump outlet is vertically positioned on an upper side of the suction filter.

11. The filter module according to claim 1, wherein in a state where the filter module is installed to the fuel pump, the jet pump inlet is vertically positioned on an upper side of a horizontal plane that extends through the connector outlet.

12. The filter module according to claim 11, wherein:
the connector main body includes a bent portion while the bent portion is bent and is placed between the connector inlet and the connector outlet; and
the connector opening portion is formed at the bent portion.

13. The filter module according to claim 1, wherein in a state where the filter module is installed to the fuel pump, the jet pump inlet is vertically positioned on an upper side of a horizontal plane that passes the filter opening portion.

14. The filter module according to claim 13, wherein the jet pump inlet and the filter opening portion are coaxial to each other.

15. The filter module according to claim 1, further comprising a check valve that is placed in the inside of the jet pump main body, wherein the check valve enables a flow of the fuel from the jet pump inlet side toward the jet pump outlet side and limits a flow of the fuel from the jet pump outlet side toward the jet pump inlet side.

16. The filter module according to claim 1, further comprising a hose that connects between the connector opening portion and the jet pump inlet.

17. The filter module according to claim 1, further comprising a trapping filter that is placed between the connector opening portion and the connector outlet in the inside of the connector main body and is configured to trap air contained in the fuel.

18. The filter module according to claim 1, further comprising a plate portion that is placed between the connector opening portion and the connector outlet in the inside of the connector main body, wherein:
in a state where the filter module is installed to the fuel pump, the plate portion vertically downwardly tilts from an end part of the connector opening portion, which is located on the connector outlet side.

19. The filter module according to claim 1, further comprising a limiter valve that is placed adjacent to the connector inlet, wherein the limiter valve enables a flow of the fuel from the cavity side toward the connector outlet side and limits a flow of the fuel from the connector outlet side toward the cavity side.

20. A fuel pump module comprising:
the filter module of claim 1; and
the fuel pump that includes the suction inlet while the suction inlet is configured to suction the fuel and is connected to the connector outlet, wherein:
the suction filter is shaped into a planar form;

the fuel pump is shaped into an elongated form and is placed such that a longitudinal direction of the fuel pump is parallel to a direction of a plane of the suction filter.

21. The fuel pump module according to claim 20, wherein in a state where the fuel pump module is placed in the inside of the fuel tank, the fuel pump is vertically positioned on an upper side of the suction filter.

22. The fuel pump module according to claim 20, wherein:
   in a state where the fuel pump module is placed in the inside of the fuel tank, the suction filter is placed such that a direction of the plane of the suction filter is along a horizontal direction; and
   the fuel pump is placed such that the longitudinal direction of the fuel pump is along the horizontal direction.

23. The fuel pump module according to claim 20, wherein the jet nozzle and the jet pump outlet are placed such that an axis of the jet nozzle and an axis of the jet pump outlet are parallel to the longitudinal direction of the fuel pump.

24. The fuel pump module according to claim 20, further comprising a wall portion, wherein in a state where the fuel pump module is placed in the inside of the fuel tank, the wall portion is vertically positioned on an upper side of the suction filter and is located along an axis of the jet pump outlet.

* * * * *